United States Patent Office 2,809,540
Patented Oct. 15, 1957

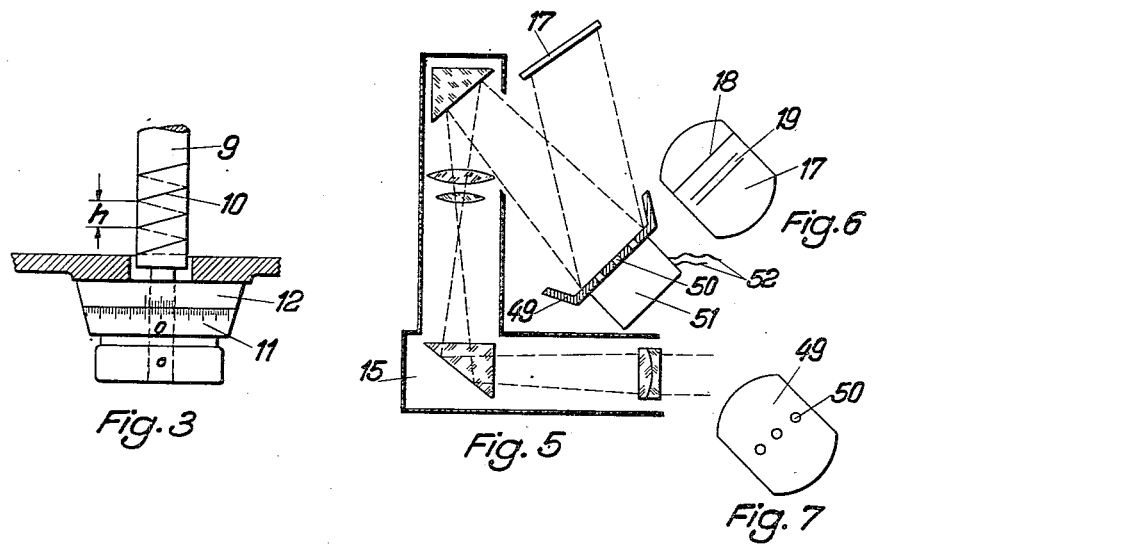
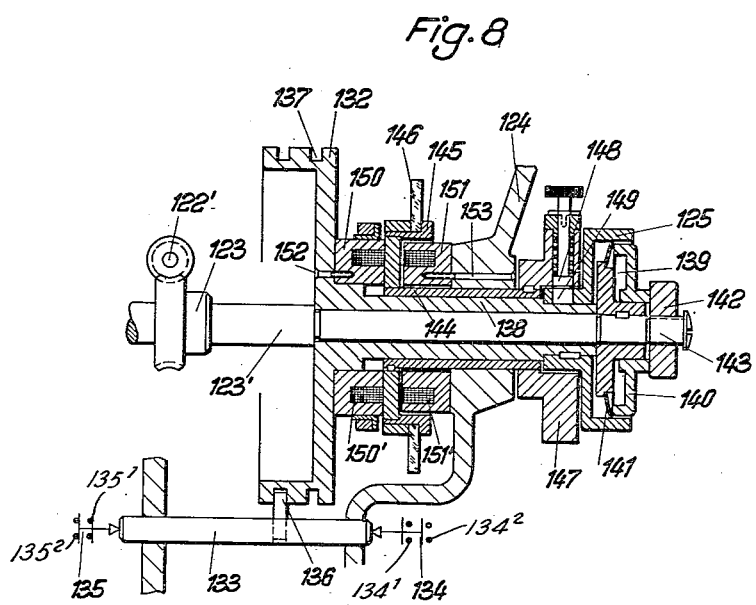

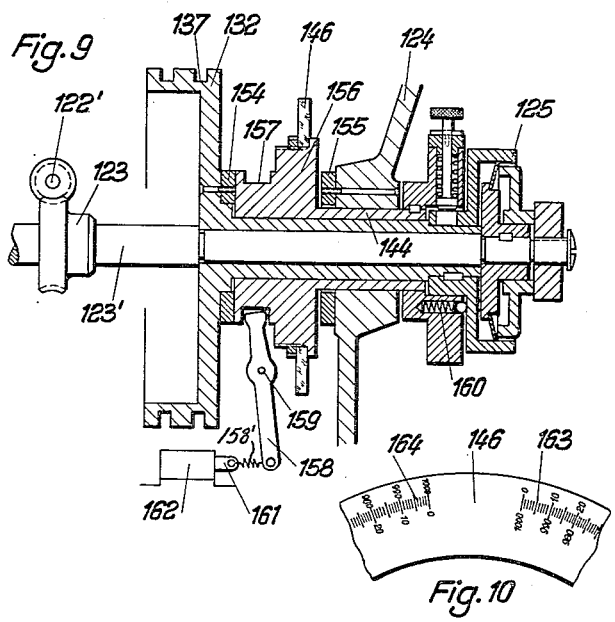
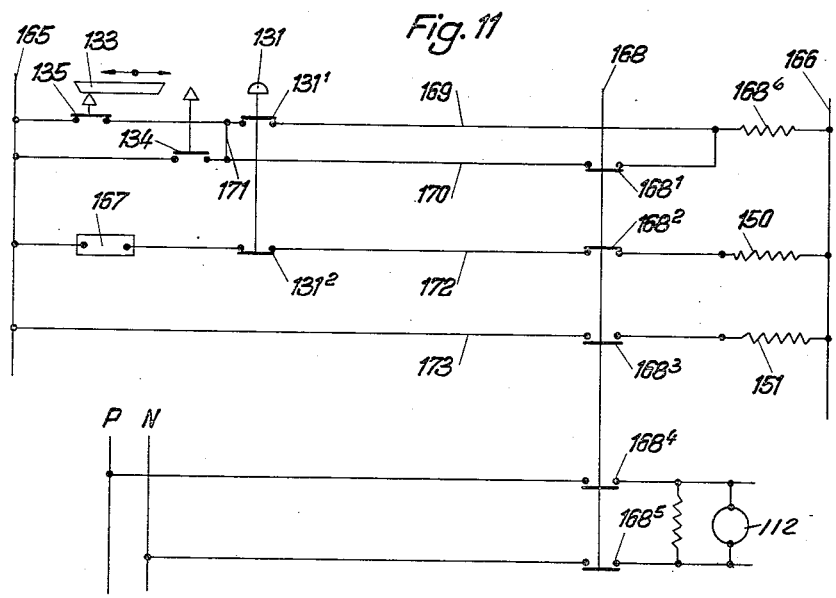

2,809,540

APPARATUS FOR THE EXACT ADJUSTMENT OF MACHINE TOOLS

Kurt H. Schultze, Berlin-Frohnau, Germany

Application September 2, 1953, Serial No. 378,132

Claims priority, application Germany September 10, 1952

16 Claims. (Cl. 77—5)

This invention relates to improvements in machine tools and particularly to improvements in the adjustment and limiting the displacement of at least one table for coordinate boring machines having coarse and fine scales, respectively, where at first a fast displacement motion is imparted until a previously set coarse scale value has been reached and subsequently a slow motion is imparted by the actuation of a contacting arrangement until said motion is brought to a stop shortly before or when having reached the set value.

The use of coarse and fine scales in machine tools is well known. Also optical systems have been employed in order to project the scale division of the fine scale in an enlarged manner upon a screen. The table displacement by hand is stopped when the graduation line of the fine scale becomes visible between the two lines inscribed upon the screen. The coarse setting is effected upon a visible coarse scale arranged along the table. Having reached the coarse value the drive was stopped. The movement of the table having stopped said table was subsequently finely adjusted by hand. It has also been proposed to impart slow motion, after the coarse adjustment, by operating a contact arrangement in order to increase the accuracy of the final setting. For this reason the table was stopped either shortly before or on reaching the exact value previously set. This slow motion has also automatically been stopped. Also employed have been adjustable and lockable measuring stops which were set accurately by means of a microscope, which together with the stop is mounted upon a measuring table. The displacement motion of the table is stopped by contacting a table stop with the measuring stop, said contact being established by a slide coupling which is actuated on contacting said measuring stop. It has also been proposed to reduce the adjusting force prior to reaching the stop in order to have the table come to a stop free from bumps or vibrations. It is disadvantageous, however, to have a second guiding means for the displacement of the focusing microscope with the measuring slide, which guiding means must absolutely correspond with the table guiding means, as otherwise every deviation between the two guiding means will cause measuring mistakes. Each mistake of the table guiding means will result in an enlarged measuring mistake. Moreover, it is disadvantageous that the microscopic process of setting the measuring slide is bothersome, time-consuming, and inaccurate on account of the possibility of mistakes.

The use of non-protected coarse scales is disadvantageous in that they get very easily dirtied in the machine shop and are liable to become easily damaged, preventing a setting and reading of the scale divisions. Moreover, reading must be done from some distance, causing setting difficulties. Another disadvantage lies in the fact that these longitudinal scales must be provided with slides adapted to operate contacts. The noses of these slides also may get dirty so that the accuracy of stopping the process is questionable. In addition, longitudinal scales require space ranging across the whole length of the distance to be traversed.

When automatically stopping the table after having changed over to slow motion it has so far not been possible to have visual control.

The invention has for an object the provision of means adapted for improving the accuracy when setting coarse and fine scale divisions, respectively, and to eliminate the disadvantages encountered hitherto. This is accomplished in that the coarse scale and the contact arrangement together with a shaft running synchronously with the displacement motion of the table can be coupled and decoupled by means of a coupling whereby in the case of decoupling the coarse scale division is set, thereupon the shaft is coupled with the contact arrangement and the table returns to neutral, during which time the contact arrangement is actuated and changes the table to slow motion or stops it altogether. At the time of the table's stop the drive and/or the table may be locked. The setting apparatus and the contact arrangement need but little space and can easily be mounted inside the control box, guaranteeing easy and accurate reading. Switching-off and/or switching-over of the drive always taking place in the neutral position of the contact arrangement switching-off is extremely accurate. Operation and setting of the machine becomes exceedingly simple because a displacement of slides with stops along a coarse scale is eliminated.

A preferred embodiment of the invention consists in the mounting of one or two transparent scale discs having scales running in opposite directions, and a curve drum mounted upon a shaft being able to be coupled with the motion of the table, each scale disc being provided with an optical system with screen and lamps which operate in conformity with the direction of motion, whereby the curve drum actuates a bar which operates contacts mounted on both ends of said bar. The two scale discs can be firmly attached to a hollow shaft connected with the curve drum and arranged at both sides of the drum.

By means of this apparatus the table adjustments can only be effected according to the additive system, i. e., the values to be set at the scale disc must be added whereby the measure of displacement is the result of the previous setting of the table. These displacement measures for the successive table motions must be figured from the drawing when, as is often done, measurements are taken from two reference edges or from a zero point of the workpiece. In such a case, which hereafter will be called the zero point system, the measurements recorded according to coordinates are referred to a zero point of the coordinate system, so that for example for two bores the distances from one reference edge will be 100 and 150, respectively.

According to the additive system the number 100 is set as the first measuring value and the number 50 as the second value which results from the difference of both kind of measurements. It is an object of the invention to set both kind of measurements according to choice.

In this particularly suitable embodiment of the invention the scale disc is rotatively and axially displaceably mounted upon the hollow shaft, which is connected with the curve drum, and is optionably connectable with the curve drum for the displacement of the table according to the additive system, or is connected with the curve drum for the displacement of the table according to the zero point system during preselection, and during the displacement of the table and the synchronous return of the drum is detached from same and connected to a stationary part of the setting apparatus while maintaining the setting value. This constitutes a further advantage in that the preselected measuring values remain visible enabling the displacement of the table to be checked at any moment. The setting scale is suitably connected with a sliding part arranged at both ends with coupling parts, one coupling part of which is stationary and the other is mounted to the curve drum. The sliding part is preferably constructed as a disc operating as a magnet armature rotatively mounted between housing and electromagnet, which are mounted to the curve drum, and fixed upon the hollow shaft of the curve drum to a sleeve slidably mounted around the electromagnets, said sleeve carrying a dog capable of being pulled in and out, respectively, which connects said sleeve with the hollow shaft of the curve drum. It is also possible to replace one of these electromagnets by a spring, so that only one electromagnet operates the sliding part which is pressed by the spring against a friction ring mounted to the curve drum, and by the electromagnet against a friction ring mounted to the stationary housing.

The electromagnets can be considered as magnetic couplings. It is, therefore, possible to use electromagnetic couplings instead of electromagnets.

A preferred embodiment of the control procedure of the invention consists in the control circuit of the electromagnets and/or the tractive magnet having a selective switch, a circuit closer, the contact arrangements controlled by the curve drum, and a contactor which causes switching-on and off, respectively, of the electromagnets and/or tractive magnet and at the same time operates the displacement drive to be switched-on and off, respectively. The selective switch enables the setting either of the additive or the zero point system.

The invention is not limited to be used in connection with other fine adjustment devices. It can also be employed in machines where table displacement takes place only by means of a setting scale equivalent to a coarse scale, because it is possible to effect fine adjustment by hand.

Another object of the invention consists in the coarse scale and the fine scale being both projected onto screens mounted next to each other upon the control box. The fine scale is a known cylinder having a mirror-finish surface on which the graduation is inscribed in the form of a fine helical line which is projected to and read off the screen provided with a reticle. The two scales next to each other make setting and reading of the set value and makes, furthermore, simple visual control of the enlarged projected scale division possible. Furthermore, it is possible to stop the slow motion by a photocell when the preselected value has been reached, the projected scale division of the fine scale controlling one or several photocells which on being actuated stop the movement of the table. For this purpose there is arranged in the light beam of the projected scale division of the fine scale a mirror having openings in the direction of the projected scale division, the openings being optically situated between the limiting graduations of the reticle, and behind which are arranged the photocells. In order to make visual control possible in the case of an automatic stop, the micro-light for the illumination of the scale division lights up said scale division on reaching the range of visual control, and goes out in a delayed manner after the stop.

The invention is by way of example shown in connection with a coordinate boring machine; it is, however, not limited to machine tools but may be employed wherever it is a question of the fine adjustment of displaceable machine parts.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 3 is a front elevational view of the measuring drum with a fine scale on an enlarged scale;

Fig. 4 is a plan view of the screen in Fig. 1;

Fig. 5 is an elevational view of a photocell control applicable to the device as shown in Fig. 1;

Fig. 6 shows a plan view of the screen shown in Fig. 5;

Fig. 7 shows a component part of Fig. 5;

Fig. 8 shows the cross section of the embodiment of another setting device which operates optionally according to the additive or zero point system;

Fig. 9 shows a cross section of a modified embodiment of the setting device shown in Fig. 8;

Fig. 10 is the scale disc of the setting devices shown in Figs. 8 and 9; and

Fig. 11 shows the wiring diagram of the devices shown in Figs. 8 and 9.

Figure 1:
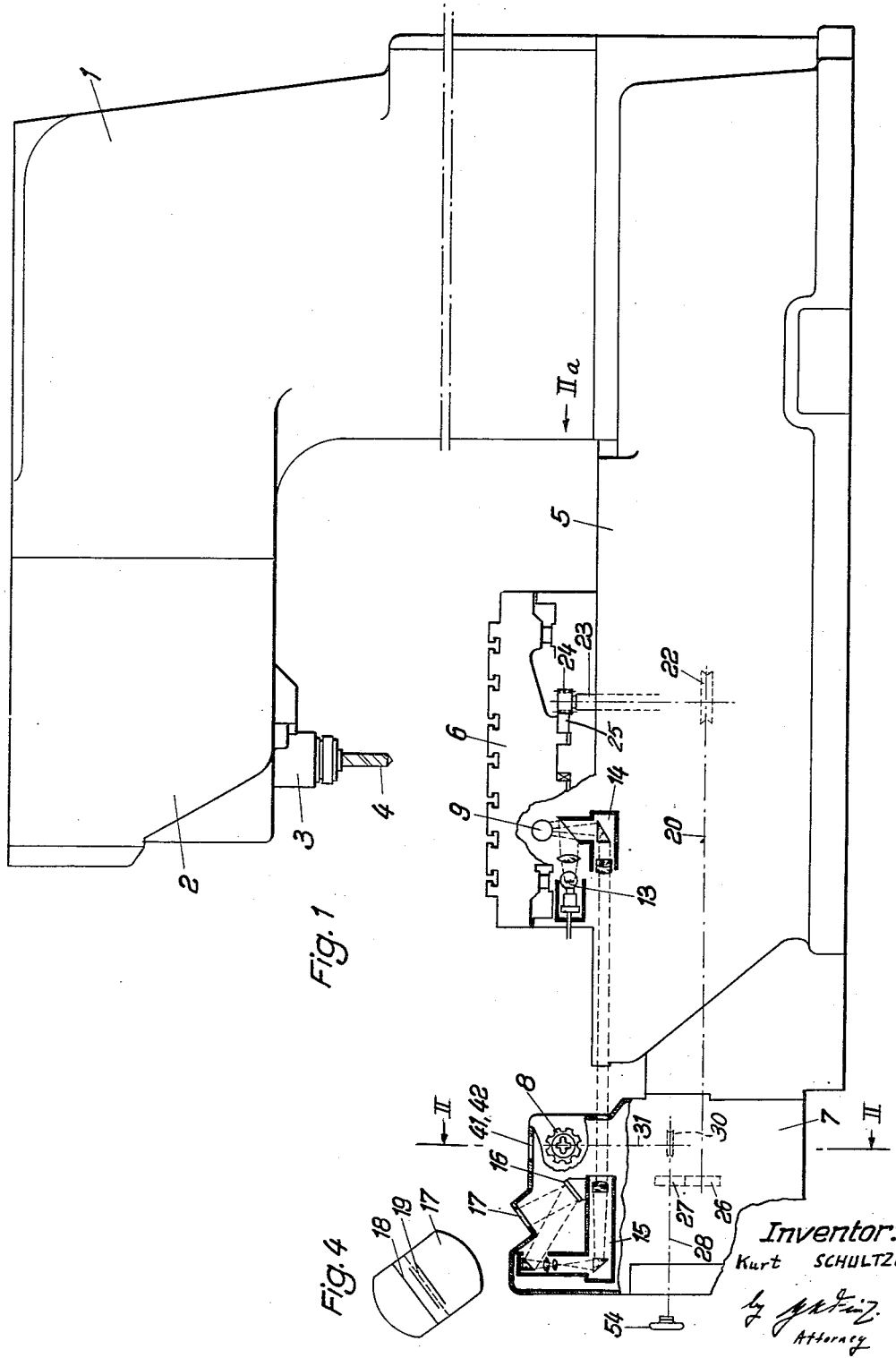
Fig. 1 is a side elevation of a coordinate boring machine having an adjustable table according to a first embodiment of the invention.

Referring to the drawings in detail, there is illustrated in Fig. 1 a housing 1, a spindle head 2 provided with a boring spindle 3 and a tool 4, a bed 5 provided with longitudinal slots, and an adjustable table 6 in the form of a cross table. A control box 7 is arranged in front of the machine bed. The control box is symmetrically constructed and provided with hand wheels 8 on both sides adapted (only one hand wheel 8 being shown) for presetting the coarse value of two tables. This arrangement is shown in detail in Fig. 2.

A fine scale 9, shown in Fig. 3, shows a fine helical line 10 the pitch of which is referred to as $h$ and constitutes a very accurate measuring unit which upon turning a scale drum 11 and a vernier 12 may be subdivided into thousandths of millimeters. The helical line is projected by means of a lamp 13, an objective 14, a telescope 15 contained in control box 7, and a mirror 16 onto a transparent screen 17 where part of the line appears as a division line 18. A reticle with two parallel lines 19 is provided on the screen. It is also possible to provide the two lines on a reticle contained in the beam of light and have them projected. The dotted line of the scale division between the two lines on the reticle in Fig. 4 shows the exact final position of the table according to the preselected setting value which is composed of the coarse and fine setting, respectively.

Figure 2:
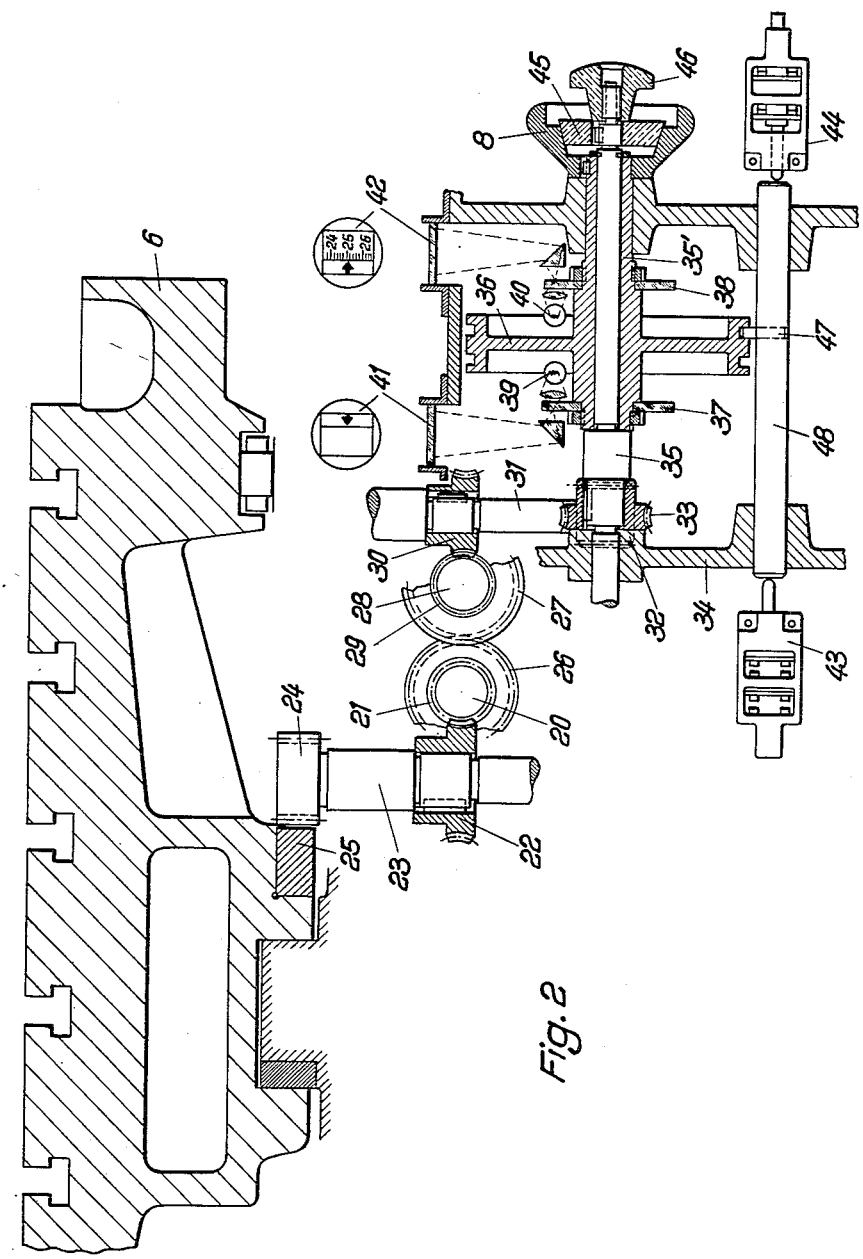
Fig. 2 is a partial cross section on an enlarged scale of the coarse adjustment with preselection shown in Fig. 1.

Fig. 2 shows a hand wheel 8 mounted on the control box 7. The table 6 is driven by a shaft 20 by way of a worm 21 and a worm wheel 22 mounted upon a shaft 23 which is provided with a pinion 24 which meshes with a rack 25 of table 6. The shaft 20 by way of gears 26 and 27 drives a secondary shaft 28 provided with a worm 29 which meshes with a gear 30. This gear 30, mounted to a shaft 31, by means of a worm 32 drives a worm wheel 33 and a shaft 35 which is located in a housing 34 of control box 7. Shaft 35, therefore, runs synchronously with the adjustable table 6.

A curve drum 36 is rotatably mounted on a hollow shaft 35′ for the purpose of adjustment by a hand wheel 8. Two transparent scale discs 37 and 38 are mounted on said curve drum and its graduations and members are projected in magnified form by lamps 39 and 40 arranged in said curve drum 36 upon mat screens 41 and 42. Fig. 2 shows the right hand scale 38 illuminated by one of the contacts 43, 44 whereby the scale has become visible on mat screen 42. A conical coupling 45, mounted on shaft 35, can be coupled with hand wheel 8 by means of a handle 46. In order to preselect the coarse measuring value this conical coupling is decoupled and hand wheel 8 set to the coarse value by turning same either to right or left, whereby this value is indicated by the one or the other scale disc. The curve drum 36 by means of a pin 47 controls a bar 48 which actuates contacts 43 and/or 44. This device operates as follows: When the table feed is switched on and the set curve drum, together with shaft 35 returns opposite the direction of setting, the table comes to a stop in the neutral position of the curve drum. Prior to reaching the set coarse value the contacts 44, in the case of a change of direction the contacts 43, the quick motion of the table is switched off and changed to slow motion which then is switched off on reaching the zero position. The fine adjustment can subsequently be done by hand.

In order to finely adjust the motion of the table by hand the front of the control box is provided with a hand wheel 54 mounted upon the secondary shaft 28. Thus it is possible to move the scale division 17 manually between the two limiting lines of reticle 19.

Instead of fine adjustment by hand an automatic move and automatic stop of the table on reaching the preselected value is possible by means of photoelectric control, as shown in Fig. 5. In this case the contacts 43 and/or 44 operate in such a way that the slow motion for the fine adjustment of the table is maintained beyond the preselected coarse value and switched off by the photoelectric control device.

The optical device shown in Fig. 5 comprises the telescope 15 which depicts the graduation of the fine scale 9, projected by the objective 14 by way of a mirror 49, upon the screen 17. The mirror 49 is provided with holes or slots 50 in such a way that optically they lie exactly between the two lines on the reticle 19. Through these slots the projected micro-light of lamp 13 operates a photocell 51 arranged behind the screen, which photocell by way of conductors 52 actuates a contactor-control device (not shown), the photocell current having previously been increased by an amplifier (not shown). This current closes an electrical relay (not shown) until the preselected scale division 17 enters the limiting lines 19 and covers the photocell 51 whereby the relay drops and the table automatically stops. The circuit of the micro-light contains a time-delay relay (not shown) which after switching-off drops causing thereby the micro-light also to switch off by delayed action in order to make visual control possible. The setting device shown in Figs. 8 to 11 makes selective setting possible according to the additive or the zero point system. A shaft 123' being the equivalent of shaft 35 of Fig. 2, is also mounted in a housing 124 of the control box 7 of Fig. 1; it is operated by a hand wheel 125 equivalent to hand wheel 8 of Fig. 1. A shaft 122' is the equivalent of shaft 31 shown in Fig. 1, and a worm drive 123 is the equivalent of worm drive 33 shown in Fig. 2. A curve drum 132 on turning displaces an axially mounted bar 133 which by actuating contacts 134 and 135 disconnects the drive of the displacement motions in both directions when the curve drum is at neutral. The movement of bar 133 is transferred by a pin 136 which meshes with a groove 137 cut helically into the rim of said drum. The curve drum 132 and the hollow shaft 138, which latter carries the hand wheel 125, consist of one piece. Shaft 123' is connected with the hollow shaft 138 by a coupling 139 and is effected by pressing part 140 against a spring disc 141 by turning a knob 142 which is screwed onto a threaded portion 143 of shaft 123'. A sleeve 144 is rotatably and slightly axially displaceably mounted on the hollow shaft 138. A disc 145 on which is mounted a scale disc 146, is attached to this sleeve 144. The other end of said sleeve is provided with a disc 147 on which is mounted a dog 148, capable of being pulled in and out, which meshes with an opening 149 in the hub of hand wheel 125, when the scale disc 147 is to be firmly fixed to said hand wheel 125 in order to make it possible to preselect according to the additive system. In Fig. 8 said dog is shown raised so that the connection between hand wheel 125 and the scale disc 147 is broken. Two electromagnets 150 and 151, mounted on opposite sides of disc 145, have windings 150' and 151', respectively. The electromagnet 150 is constructed as a ring magnet and connected with drum 132 by screws 152. The electromagnet 151, also constructed as a ring magnet, is mounted to the control box 124 by screws 153. The disc 145 which acts as armature for these magnets is drawn either by one or the other magnet and connected either with drum 132 or the housing 124 of the control box.

Fig. 9 shows another embodiment of the presetting device. Similar reference characters are employed to denote the same or similar parts.

A friction ring 154 is mounted to the drum 132, and a friction ring 155 to housing 124. A coupling part 156 to which is fixed the scale disc 146 is mounted axially displaceably between drum and housing. In the figure shown this coupling part 156 and sleeve 144 consist of one piece, which is pressed by a plurality of springs 160, of which only one is shown, against the friction ring 154. A two-armed lever 158, the fulcrum of which is stationary at 159, engages a circular groove 157 of the part 156. In addition, armature 161 of tractive magnet 162 is connected with said lever through a spring 158' which presses coupling part 156 against the friction ring 155 when energizing circuit (not shown) of the magnet is closed.

Fig. 10 shows part of the scale disc 146 with scales 163 and 164 running in opposite directions. The disc is illuminated by a lamp (not shown in the drawing) which by means of an optical system, which also is not shown, projects the scale on to the screen.

Fig. 11 illustrates the wiring diagram for the presetting device according to the zero point system as shown in Fig. 8. The control circuit comprises conductors 165 and 166. 167 is a selector switch and 168 a contactor having contacts $168^4$, $168^5$ connecting a motor 112 with the lines P and N. The working contacts of said contactor 168 are designated $168^1$, $168^3$, $168^4$, and $168^5$, and the no-voltage contact with $168^2$. A starting button 131 is connected with a working contact $131^1$ and a no-voltage contact $131^2$. The contact 135 shown in Fig. 8 and the working contact $131^1$ are connected in a conductor 169 which connects control conductors 165 and 166. The holding current of the contactor passes through the working contact $168^1$, and the conductors 170 and 171 to the normally closed contact 135. In addition, a contact 134 is also arranged in conductor 170. The electromagnet 150 is closed via the no-voltage contact $168^2$, a conductor 172, the no-voltage contact $131^2$, when the selector switch 167 is closed. The electromagnet 151 is connected in a conductor 173 and is at first switched off via working+contact $168^3$. The displacement motor 112 is started by means of the working contacts $168^4$ and $168^5$. All contacts are shown in the position which they have when the preselection has been effected. The electromagnet 150 is closed in this process.

When the starting button 131 is shortly depressed the actuating coil $168^6$ of the contactor 168 receives current via contact $131^1$, which at this moment is closed, so that the actuating coil $168^6$ attracts and holds its position via the closed contact $168^1$. The electromagnet 150 at the same moment is switched off via the now open contact $168^2$, and the electromagnet 151 switched on via the now closed contact $168^3$. At the same time the displacement motor 112 is switched on via the contacts $168^4$ and $168^5$. The curve drum 132 returns to the zero position, in which position the contact 135 opens and interrupts the holding current for contactor 168. The displacement motor is stopped, the electromagnet 151 switched off, and the electromagnet 150 switched on again. The process is now repeated.

When a measuring value is to be preselected in a direction opposite to the previous displacement it suffices to return the scale disc to the new measuring value. By this means the curve drum 132 is put back in the direction equal to the difference of these measuring values and at the same time the direction of motion of the drive is changed from clockwise to counter-clockwise.

In operation, the spindle head 2 is fixed while the tool 4 is movably mounted therein. This head 2 houses, as conventional, the gear mechanism for the rotational drive of the tool. The table 6, designed as carriage, is displaceable in the directions of two coordinates with respect to the spindle head 2. The carriage or table 6 is manually adjustable by means of the hand wheel 54 (see Fig. 1) acting via the gear train 27, 26, 22 on the pinion 24 which, in turn, acts on the rack associated with the table 6. Figure 2 shows the same pinion 24 engaging the rack 25 of the carriage 6, and, furthermore, the shaft 23 and the worm gear 22 engaging the worm 21. A motor (not shown in Figs. 1 and 2) built in the machine frame serves as power drive acting via the shaft 20 (see Figure 2). This motor, provided as in other known machine tools, is indicated in the circuit diagram of Fig. 11 at 112. If the motor 112 runs in the one or the other direction, its rotation is transmitted to the pinion 24, displacing the carriage 6 correspondingly.

The displacements of the carriage by the motor 112 comprise two displacing motions directly following one another, i. e., a first feed movement at high speed, which may be called normal speed, and a second feed movement directly following the first movement at low speed, or in slow motion and terminating when the carriage is stopped at the end of the feed movement caused by the motor. The final setting at a precision of $\frac{1}{1000}$ of a millimeter is always carried out manually by means of the handwheel 54 in accordance with the projected division line 18 corresponding to the projected fine line 10 of the fine scale 9 in Figure 3. This kind of fine scales, as shown in Fig. 3, having an adjustable scale drum 11 and a vernier 12, in which the fine line 10 is helically scribed with the threads spaced 2 mm. by means of a diamond in accordance with older patented methods of the firm of Herbert Lindner G. m. b. H., of Berlin-Wittenau (West-Sektor), Germany. The optical means for projecting the division line of the fine scale 9, which have been likewise known, comprise an objective 14, the telescope 15, the light source 13 and other optical members, such as prisms and lenses. The fine scale 9 is rotatably mounted in the carriage 6 and is taken along thereby during the travel of this carriage in longitudinal direction. The control box 7 is secured to the front of the machine frame by means of a flange and, therefore, is stationary. The same is true for the optical member 15 in the control box 7 and the optical member 14 in the machine frame. Thus, the projected fine division line 18 is projected on the screen 17 within the control box 7 along the path indicated in Figure 1 with dotted lines, said screen being provided with two lines or division marks 19 close to one another in a manner known per se (see Fig. 4). The final setting is obtained when the division line 18, as shown in Fig. 4, is exactly in the center between the two lines 19. As mentioned in the foregoing, this final setting is caused by manual adjustment at a precision of $\frac{1}{1000}$ of one millimeter.

In the machine tool according to the invention, the carriage is successively displaced in three ways:
(1) at high speed by the motor;
(2) at low speed by the motor;
(3) by manual adjusting of the dividing line 18 to the center between the lines 19.

The change-over of the motor drive of the carriage from high speed (operation 1) to low speed (operation 2) is caused by a slidable clutch associated with the normal gear mechanism, whereby this clutch is engaged either with the one or with the other gear of the gear mechanism, similar as shown in Figure 2, U. S. Patent 2,311,142 to Turrettini, cited by the examiner. In the actual construction of applicant's machine tool, a clutch body or sleeve, similar to 27 in Figure 2 of the aforementioned Turrettini patent, is controlled by means of two electromagnets, such as 11 and 12, according to the same reference.

The electric control impulse causing the change-over from high speed to low speed operation is obtained by actuation of the double contacts 43 or 44 (Fig. 2), depending upon the direction of displacement of the carriage, i. e., by means of one of the inner contacts $43^1$ or $44^1$, respectively. The power drive then continues to operate at low speed, whereby any acceleration of the mass of the carriage which would result in an improper setting in case of high speed operation is excluded by the change-over to low speed operation.

Simultaneously with the change-over to low speed operation, the current for the lamp 13 is switched on, the light beam of this lamp projecting the division line 18 on the screen. The same electric switch contacts $43^1$ or $44^1$ are used to switch on the lamp 13.

After a predetermined displacement at low speed has taken place, one of the outer contacts $43^2$ or $44^2$ is closed and the carriage travel stopped, this closing being obtained due to additional displacement of the control bar 48 (see Fig. 2). The contacts 134 and 135 in Figure 11 correspond to the contacts $43^2$ and $44^2$, respectively, which may be called end contacts. It can be seen from Figure 4 that the feed by the carriage motor 112 will be interrupted when one of the contacts 134 or 135 is closed, so that the carriage travel will be stopped.

Primary attention is directed to the arrangement of the double contacts 43 and 44 shown in Figure 2. The contact gap at $43^1$ is smaller than that at $43^2$. Consequently, when the control bar is displaced to the left, the contact $43^1$ is closed first, said contact causing the control impulse for the change-over to slow speed. Thereafter, the contact $43^2$ is closed, stopped the displacement of the carriage. In Figure 2, the two contacts $44^1$ and $44^2$ are shown closed at the right sides. This is the condition in which the slow feed motion is stopped in this direction.

It is evident from the foregoing that the carriage is accurately displaced under control of the contacts $43^1$ and $43^2$ or $44^1$ and $44^2$ in such a manner, that the projected division line 18 stops close at the lines 19. This has the great advantage that the machine tool operator has to carry out manually only the very last fine adjustments by turning the hand wheel 54, while observing the division line 18 which has to be brought in the center between the lines 19. Since the fine scale 9 is provided within the carriage 6, the accurate setting of the division line 18 takes place together with the last fine adjustment of this carriage.

In the diagram of Figure 11a, which is similar to that of Figure 11, the contacts 134 and 135 of the latter are divided into contacts $134^1$ and $134^2$ and $135^1$ and $135^2$, respectively. The contacts $134^2$ and $135^2$ are inserted in the conductor 174 which includes the high speed relay 175. An electromagnet coil 150a shunted to the magnet coil 150 is adapted to cause change-over of the gear mechanism to slow speed, while an electromagnet coil 151a shunted to the electromagnet coil 151 serves to change-over to high speed. The contacts $175^1$ and $175^2$, inserted in the leads 172 and 173, respectively, are operatively connected with the high speed relay 175. The diagram of Figure 11a shows the instant, at which the carriage is adjusted by bringing the drum 36 or 132 to the predetermined setting. This can be recognized from the displacement of the control bar 133 so that the double contact 135, comprising the individual contacts $135^1$ and $135^2$, is closed. The circuit through the high speed relay 175 is then closed via the contact $153^2$, while the circuit through the electromagnet coil 150a for the slow speed is interrupted by the open contact $175^1$. The circuit through the electromagnet 151a for the high speed is closed via the closed contact $175^2$. This is the condition for starting. When the starter push button 131 is now depressed, the switch 168 is operated and held closed via its holding circuit and the contact 175². This is the condition for starting. When the starter push button 131 is now depressed, the switch 168 is operated and held closed via its holding circuit and the contact 168¹. The motor 112 will advance the carriage to a position in which the value indicated on the scale corresponds to the coarse adjustment. The drum coupled with the drive mechanism returns to the zero position reached when the carriage is adjusted. Shortly prior to the arrival at this position, the contact 135² opens so that the high speed relay 175 will be deenergized. As a result of this, the contact 175² is opened interrupting the circuit through the electromagnet coil 151a which has switched on the high speed in the gear mechanism. Simultaneously, the electromagnet coil 150a is energized by completion of its circuit via the contact 175¹ now closed, whereby the change-over to slow speed in the gear mechanism takes place. The carriage moves at slow speed until its final position is reached, at which the contact 135¹ opens when the drum arrives at its zero position. This causes the motor switch 168 to open, whereby the motor 112 is stopped. The simultaneously projected division line 18 of the cylindrical fine scale 9 is now in the field of vision of the screen 17 close to the line 19. The machine tool operator has only to carry out the fine adjustment of the carriage with the aid of the hand wheel 54 (see Fig. 1) by bringing the picture of the division 18 to the center between the lines 19. The carriage is then adjusted at a precision of 1/1000 of a millimeter.

From the foregoing it will now be appreciated that there has been provided a construction which obviates the objections of previous constructions and which accomplishes the object initially set forth.

What is claimed is:

1. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, and means for actuating said contact arrangement during the return motion of said table so as to slow down the motion of said table.

2. An apparatus as claimed in claim 1, and means for stopping the motion of said table after actuating said contact arrangement during the return motion of said table.

3. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, and means for actuating said contact arrangement during the return motion of said table, a pair of transparent scale discs having scales inscribed thereon, said scales having opposite directions, a second shaft being arranged for coupling with the motion of said table, a curve drum mounted on said second shaft, optical systems associated, respectively, with said discs and including screens and lamps, means for switching on said lamps according to the direction of motion of said table, and a bar arranged substantially parallel to said second shaft and being operatively connected with said contact arrangements mounted at either end of said bar, said bar being actuated by said curve drum, said contact arrangements being connected in series with said lamps.

4. An apparatus as claimed in claim 3, said second shaft being hollow and coaxially arranged with said shaft, said scale discs being firmly mounted on said hollow second shaft and arranged on either side of said curve drum.

5. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, means for actuating said contact arrangement during the return motion of said table, a hollow shaft being coaxially arranged on said shaft, a scale disc being mounted rotatably and axially displaceably on said hollow shaft, and a curve drum mounted on said hollow shaft, said scale disc being optionally connectable with said curve drum for displacing said table according to the additive system.

6. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, means for actuating said contact arrangement during the return motion of said table, a hollow shaft being coaxially arranged on said shaft, a scale disc being mounted rotatably and axially displaceably on said hollow shaft, and a curve drum mounted on said hollow shaft, said scale disc being optionally connectable with said curve drum for displacing said table according to the zero point system during the preselecting action.

7. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, means for actuating said contact arrangement during the return motion of said table, a hollow shaft being coaxially arranged on said shaft, a scale disc being mounted rotatably and axially displaceably on said hollow shaft, a curve drum mounted on said hollow shaft, said scale disc being optionally connectable with said curve drum for displacing said table according to the zero point system during the preselecting action, and during the displacement of said table and the synchronous return of said curve drum, and a stationary part connectable with said table when the latter is detached from said curve drum.

8. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, means for actuating said contact arrangement during the return motion of said table, a hollow shaft being coaxially arranged on said shaft, a scale disc being mounted rotatably and axially displaceably on said hollow shaft, a curve drum mounted on said hollow shaft, said scale disc being optionally connectable with said curve drum for displacing said table according to the zero point system during the preselecting action, and during the displacement of said table and the synchronous return of said curve drum, a stationary part connectable with said table when the latter is detached from said curve drum, a sliding part connectable to said scale disc, and coupling parts arranged respectively, on either side of said sliding part, one of said coupling parts being stationary, the other of said coupling parts being mounted on said curve drum.

9. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, means for actuating said contact arrangement during the return motion of said table, a hollow shaft being coaxially arranged on said shaft, a scale disc being mounted rotatably and axially displaceably on said hollow shaft, a curve drum mounted on said hollow shaft, a housing, electro-magnetic means cooperating with said housing and said curve drum, a sliding part connected to the armature of said electromagnetic means, said sliding part being designed as a rotatably mounted disc mounted on said hollow shaft of said curve drum, a sleeve arranged on said hollow shaft and being connected to said sliding part, and a dog engaging in one position thereof said sleeve so as to connect the same with said hollow shaft.

10. An apparatus as claimed in claim 9, said electromagnetic means being designed as a pair of oppositely arranged electromagnets cooperating with said armature designed as a sliding part arranged between said oppositely arranged electromagnets.

11. An apparatus as claimed in claim 9, said electromagnetic means including one electromagnet, a first friction ring mounted on said curve drum, resilient means urging said first friction ring against said sliding part, and a second friction ring mounted on said housing and being adapted to be pressed by said electromagnet against said sliding part.

12. An apparatus as claimed in claim 9, and a control circuit for said electromagnetic means, said control circuit including a selecting switch, a starting switch, said contact arrangement controlled by said curve drum, and a contactor having first contacts connected with said electromagnetic means so as to energize the same, motor means displacing said table, and second contacts forming part of said contactor and being adapted to connect said motor means with a voltage source.

13. An apparatus for adjusting and limiting the displacement of at least one table of a machine tool, comprising, in combination, coarse scale means and fine scale means measuring the displacement of the table, means for imparting a fast displacement motion to the table, said means becoming inoperative upon reaching a predetermined and preset coarse scale value, means for imparting subsequently a slow motion to said table, a contact arrangement operatively connected to said means for imparting a slow motion to said table, said contact arrangement bringing said slow motion to a stop shortly before reaching said preset coarse scale value, a shaft revolving synchronously with said displacement motion of said table, means for coupling said shaft with said coarse scale means, means for subsequently coupling said shaft with said contact arrangement, means for effecting a return motion to the zero position of said table during a displacement motion thereof, means for actuating said contact arrangement during the return motion of said table so as to slow down the motion of said table, a control box, two screens arranged next to each other upon said control box, said coarse scale means and said fine scale means being projected, respectively, on said two screens, and a cylinder having a graduation shaped as a fine helical line forming said fine scale means so as to project said helical line on one of said screens between two lines marked thereon.

14. An apparatus as claimed in claim 13, and means for photoelectrically stopping the slow motion on reaching the set fine scale value.

15. An apparatus as claimed in claim 14, and at least one photocell controlled by the projected division of said fine scale means, said photocell on being actuated stopping the displacement of said table.

16. An apparatus as claimed in claim 15, and a mirror arranged in the path of the light beam emitted by the projected division of said fine scale means, said mirror having a plurality of slots arranged in the direction of the projected division of said fine scale means, said slots being arranged so as to be optically between the limiting lines upon said one of said screens.

(References on following page)

References Cited in the file of this patent

UNITED STATES PATENTS

| | | |
|---|---|---|
| 1,775,952 | Turrettini | Sept. 16, 1930 |
| 2,109,849 | Price | Mar. 1, 1938 |
| 2,126,175 | Dalcher | Aug. 9, 1938 |
| 2,311,142 | Turrettini | Feb. 16, 1943 |
| 2,369,223 | Ferger | Feb. 13, 1945 |
| 2,440,916 | Rusnak et al. | May 4, 1948 |
| 2,465,497 | Turrettini | Mar. 29, 1949 |
| 2,466,198 | Berthiez | Apr. 5, 1949 |
| 2,488,324 | Pegard | Nov. 15, 1949 |

FOREIGN PATENTS

| | | |
|---|---|---|
| 586,323 | Great Britain | Mar. 14, 1947 |